Figure 1:
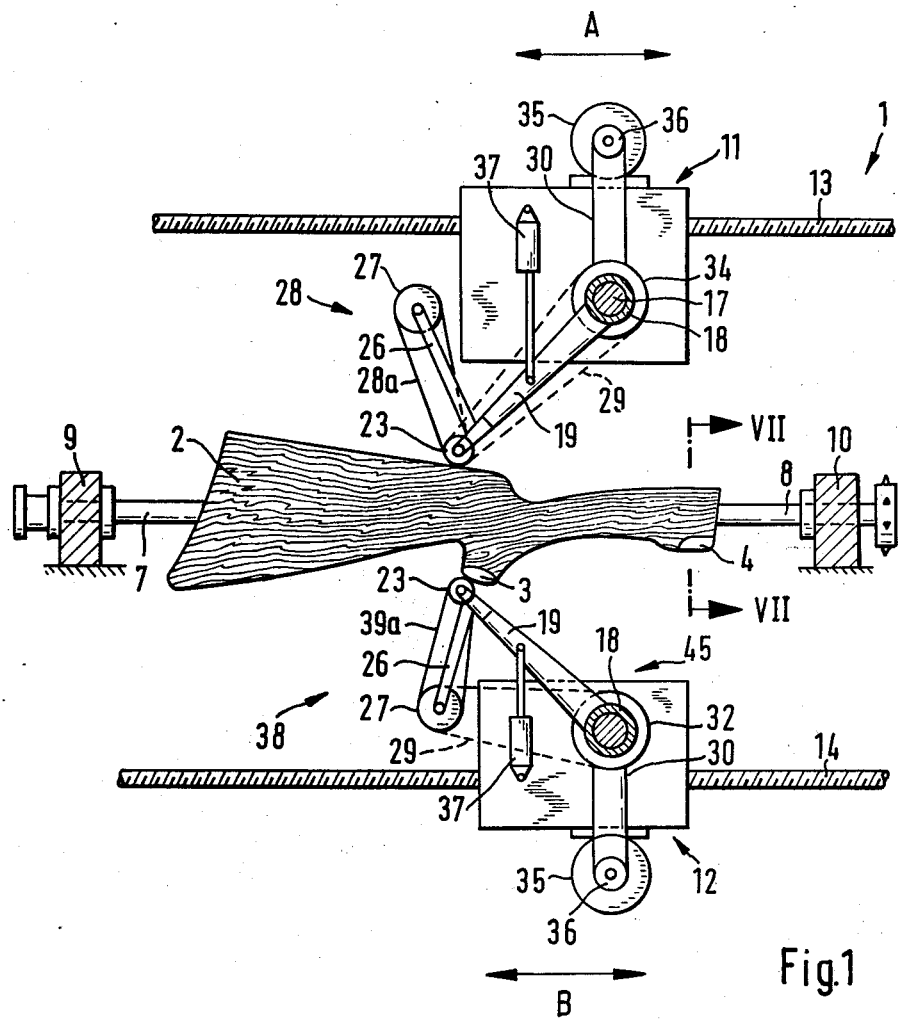

United States Patent [19]

Schmidt

[11] 4,112,628
[45] Sep. 12, 1978

[54] DUPLICATING GRINDING MACHINE

[75] Inventor: Erich Schmidt, Maversbach, Austria

[73] Assignee: Maschinenfabrik Zuckermann Komm. Ges., Vienna, Austria

[21] Appl. No.: 784,725

[22] Filed: Apr. 5, 1977

[30] Foreign Application Priority Data

Apr. 6, 1976 [DE] Fed. Rep. of Germany ....... 2614843

[51] Int. Cl.² .................. B24B 21/04; B24B 17/02
[52] U.S. Cl. ............................... 51/140; 51/144; 51/145 R; 142/7
[58] Field of Search ............... 51/140, 142, 143, 144, 51/145, 147, 101 R; 142/3, 7, 12, 13, 15; 90/13.1–13.9

[56] References Cited

U.S. PATENT DOCUMENTS

| 1,375,326 | 4/1921 | Schwarz | 142/13 |
| 2,667,901 | 2/1954 | Salstrom | 51/144 X |
| 2,896,378 | 7/1959 | Keating | 51/145 R |
| 2,963,831 | 12/1960 | Voelz | 51/142 |
| 4,002,193 | 1/1977 | Schmidt | 142/7 |

FOREIGN PATENT DOCUMENTS

| 879,374 | 7/1949 | Fed. Rep. of Germany | 51/145 R |
| 1,053,347 | 10/1953 | Fed. Rep. of Germany | 51/145 R |
| 2,311,011 | 9/1973 | Fed. Rep. of Germany | 51/145 R |

*Primary Examiner*—N. P. Godici
*Attorney, Agent, or Firm*—Finnegan, Henderson, Farabow & Garrett

[57] ABSTRACT

This invention relates to a duplicating grinding machine for grinding workpieces of irregular three-dimensional shape, wherein a model and at least one workpiece are mounted side by side in spaced parallel relation to one another between clamping devices so as to be synchronously rotatable about their longitudinal axes, said model and each of said workpieces having associated therewith two carrier arms each, one carrier arm associated with said model and at least one carrier arm associated with said workpiece being interconnected to form a unit and adapted to be brought into pressing engagement with said model and said associated workpiece, respectively, with one carrier arm of a first interconnected unit carrying a scanning roller for scanning said model and adapted to be translated along the length of said model and each other carrier arm of said first unit carrying a motor-driven belt grinding assembly having an endless grinding belt looped around a return roller and a contact roller, and with one carrier arm of a second interconnected unit carrying a second scanning roller for scanning said model opposite said first scanning roller, and each other carrier arm of said second unit carrying a second motor-driven belt grinding assembly disposed opposite said first belt grinding assembly and having a grinding belt provided with a different grinding layer and also looped around a return roller and a contact roller.

9 Claims, 7 Drawing Figures

DUPLICATING GRINDING MACHINE

BACKGROUND OF THE INVENTION

A duplicating grinding machine of the above described type is known from DT-OS No. 2,311,011. In this machine there is provided a model adapted to be scanned by two scanning rollers. Each of the two scanning rollers is connected to a separate belt grinding assembly through an individual carrier arm unit. For rational working of the workpiece, one belt grinding assembly is provided with a coarse grinding belt, and the other, with a fine grinding belt.

This arrangement permits the workpiece to be shaped to its final form in a single cycle of operations from a wooden block without any preshaping, or to be coarse- and fine-ground subsequent to preshaping.

In various technical fields, use is made of shaped objects not consisting of a homogenous material, such as wood, but comprising two or more materials. Shaping of such objects is conventionally performed in such a manner that individual parts thereof are separately shaped to matching forms and are then assembled, or that the individual parts are separately preshaped to a certain degree of accuracy, whereupon they are assembled and finished manually, such as by hand-grinding.

The reason for this separate shaping or preshaping resides in the fact that different materials require different working technologies. It is generally known that the milling tools required for milling metals are different from those required for milling plastics or wood. The same applies to grinding or different materials. Depending on hardness and other properties of such materials, the grinding material employed is required to have different properties with respect to grain size, grain embedding, material of grains, elasticity of the grinding belt etc.. Employ of the wrong type of grinding belt for a specific material may result in rapid wear of the grinding belt. Thus a wood grinding belt employed for grinding metal will be blunted very rapidly.

Workpieces consisting of several materials are encountered rather often in practice, examples being rifle stocks, golf club heads etc. These workpieces frequently comprise a material combination of wood and metal, or wood and plastics, respectively. A golf club head usually comprises all three of these materials.

Accordingly, there has for considerable time existed a demand, for instance in the weapons industry, for a solution permitting a more rational working of workpieces consisting of different materials.

It is therefore an object of the invention to provide an improved duplicating grinding machine of the type described above, permitting to finish workpieces consisting of different materials in a single cycle of operations and preferably on all sides.

In order to attain this object, the invention provides that for grinding on all sides and in a single cycle of operations a workpiece consisting of at least two materials having different grinding properties, such as of wood and metal, the model is divided into at least two partial models complementing one another with respect to accurate working of the workpiece on all sides in such a manner that at least one workpiece shape surface for engaging the belt grinding assembly with the workpiece under the control of the scanning roll of one partial model is offset with respect to at least one such working shape surface of the other partial model, and that in the remaining shaping region each partial model comprises raised portions, wherein one partial model for grinding one of said materials is associated with the scanning roller of the first carrier arm unit, which is provided with a belt grinding assembly suitable for working the first material, while the other partial model for grinding the second material is associated with the scanning roller of the second carrier arm unit, itself provided with a belt grinding assembly suitable for working said second material.

In the duplicating grinding machine according to the invention there are as many partial models as there are materials having different grinding properties in the workpiece. In such cases, in which a plastics material is employed having the same grinding properties as wood, it is not required to provide a separate partial model for working said plastics material.

The partial models have a configuration resulting in the operative engagement of the associated belt grinding assembly being positively restricted to that portion of the workpiece for the working of which the respective belt grinding assembly is provided. In those portions not to be worked by a particular belt grinding assembly, the scanning roller guides the belt grinding assembly past the workpiece.

The duplicating grinding machine according to the invention offers the great advantage that it is now possible to finish a ready-assembled workpiece consisting of different materials without any hand-finishing, a feat which was hitherto not possible. This results in a considerable rationalization and corresponding economies in the production. Further the duplicating grinding machine according to the invention permits to achieve a very high degree of accuracy in shaping a workpiece in a very simple manner.

In an advantageous embodiment the invention provides that the partial models are located side by side in a single plane and that the two carrier arm units are disposed opposite one another with respect to the partial models. If two carrier arm units are employed, this constitutes the most efficient arrangement, since the carrier arm units may then be translatably mounted laterally of the clamping devices for the workpieces and models without interfering with one another.

Certain workpieces may require overlapping working by two or more belt grinding assemblies. This may specifically be the case in interface areas where a smooth transition is required. In this case it is advantageous if the working shape surfaces of the partial model controlling working of the harder material are disposed in overlapping relation with the working shape surfaces of the other partial model.

In this manner it is ensured that only the belt grinding assembly provided for working the harder material grinds over the softer material. This does not result in the harder grinding belt being damaged, although the finish achieved on the softer material will then not be as smooth as that achieved with the grinding belt provided for this particular material.

In another advantageous embodiment the invention provides that the grinding belt employed for the harder material is longer than the other one. This results in the durability of the two belts being substantially equal, since the wear per length unit of the grinding belt provided for the harder material will then be reduced due to its increased length.

Figure 2:
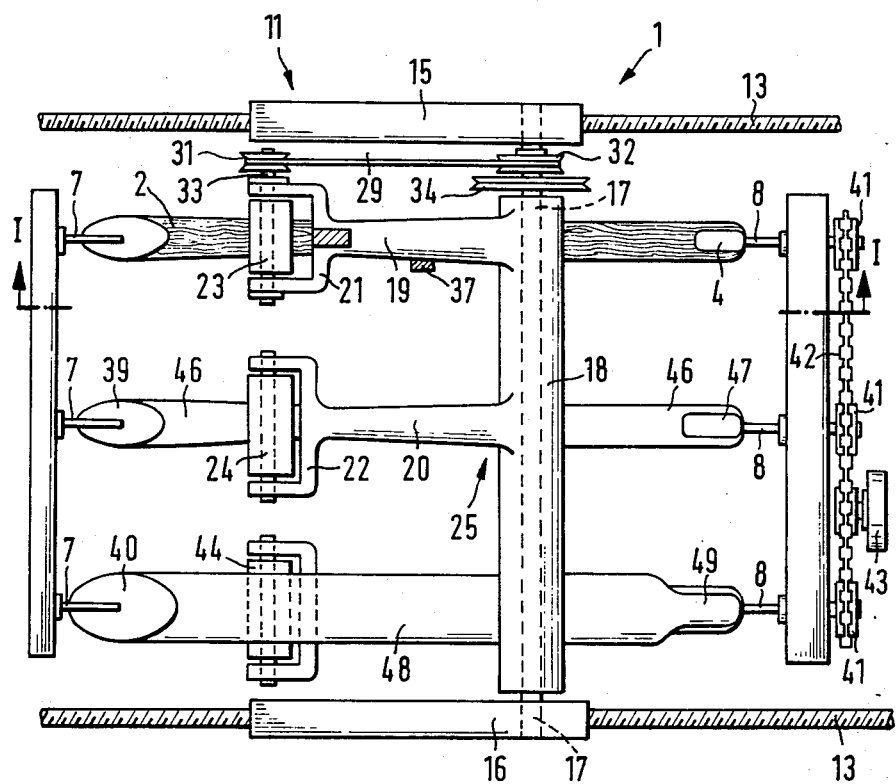
Figure 3:
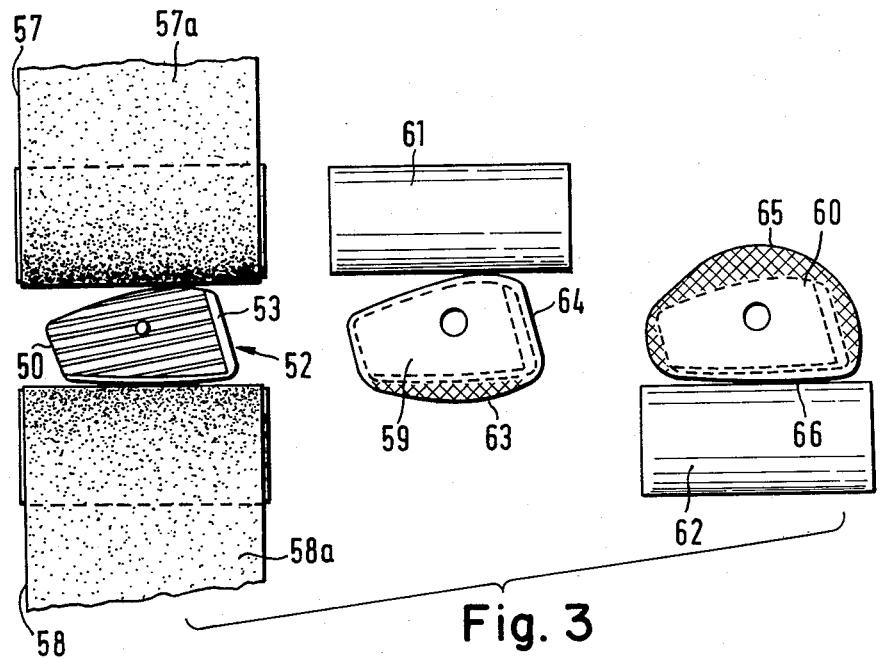
Figure 4:
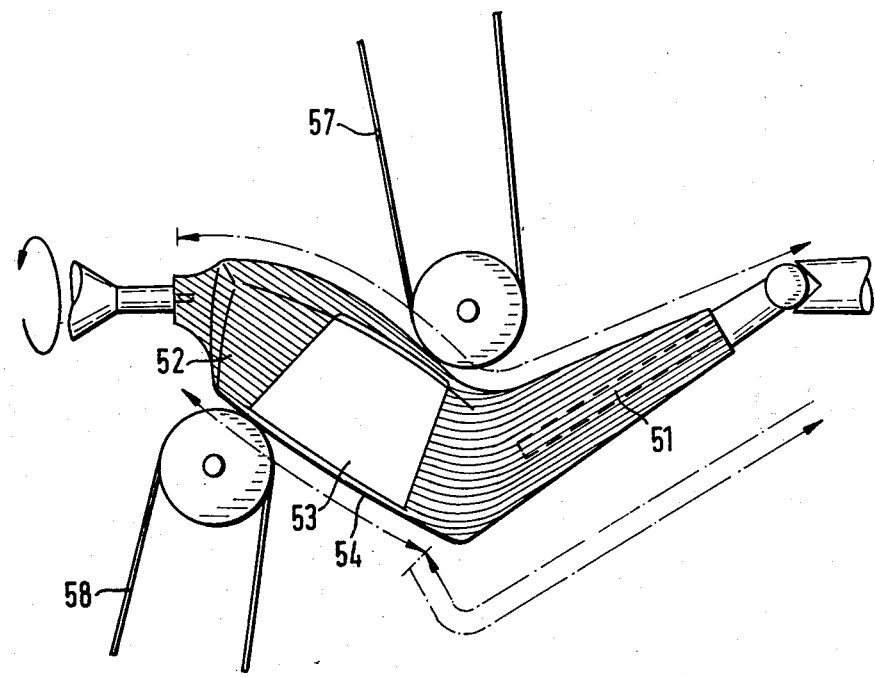
Figures 5, 7:
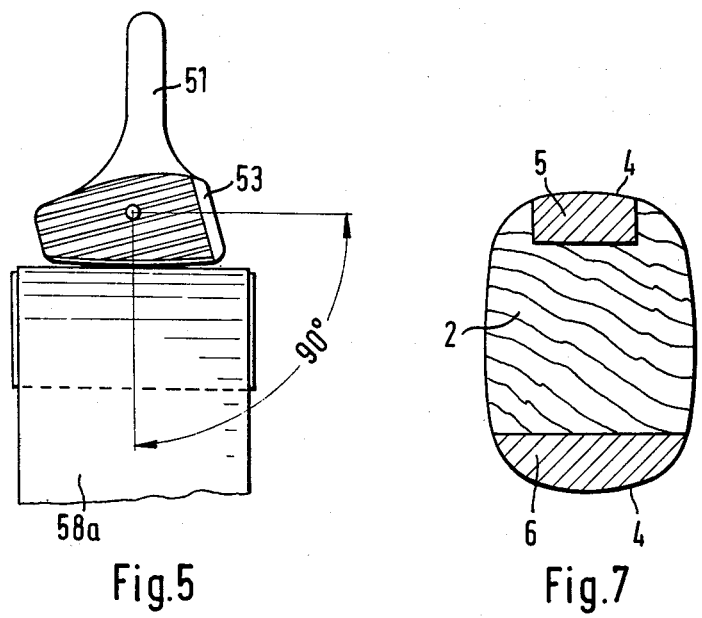
Figure 6:
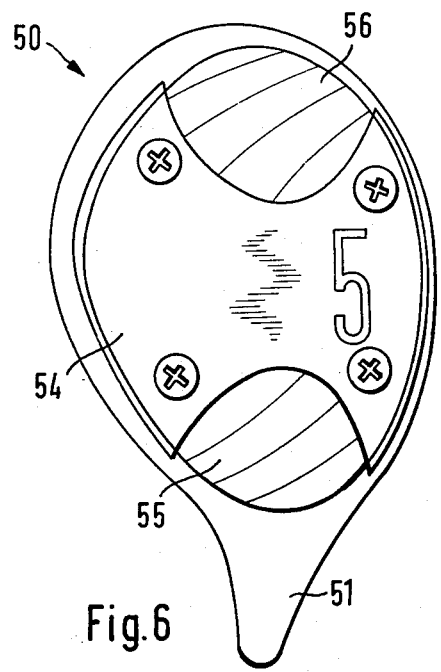

Embodiments of the invention will be described hereinafter with reference to the accompanying drawings, in which FIG. 1 shows a sectional view of the duplicating grinding machine according to the invention along the line II—II in FIG. 2, FIG. 2 a top plan view of the duplicating grinding machine shown in FIG. 1, with a workpiece in the form of a rifle stock being clamped therein, FIG. 3 shows a schematic front view of a golf club head to be ground, and of two partial models, FIG. 4 shows a side view of the golf club head shown in FIG. 3, FIG. 5 shows a front view of a golf club head, FIG. 6 shows a bottom view of a golf club head, and FIG. 7 shows a cross-sectional view of the rifle stock shown in FIG. 1 along the line VII—VII.

FIG. 1 of the drawings shows a duplicating grinding machine 1 for grinding workpieces having irregular three-dimensional shape.

In the present case the workpiece is a wooden rifle stock 2 having metal parts 3 and 4 assembled thereto.

Metal part 4 belongs to the bolt assembly of the rifle and comprises, as shown in FIG. 7, an upper and a lower countersunk portion 5 and 6, respectively.

The pre-shaped rifle stock to be finished by grinding is clamped between two clamping mandrels 7 and 8 rotatably mounted in respective bearing blocks 9 and 10. For clamping and releasing the workpiece the clamping mandrels are adapted for longitudinal movement in a conventional manner.

Above and below the clamped workpiece 2 there are provided tool carriages 11 and 12 mounted on longitudinal supports for movement in the direction of the double arrow A and B, respectively. Movement of the carriages is controlled by means of screw spindles 13 and 14 cooperating with threaded nuts (not shown) connected to the carriages. Rotation of the screw spindles causes movement of the tool carriages.

As seen in FIG. 2, each tool carriage comprises two support plates 15 and 16 disposed opposite one another and interconnected by a shaft 17. FIG. 2 shows only the support plates of tool carriage 11. It is clearly seen that each support plate has its own drive spindle 13.

Shaft 17 supports a bearing sleeve 18 having two integral carrier arms 19 and 20 projecting therefrom. The free ends of carrier arms 19 and 20 are each provided with a fork 21 and 22, respectively, with a contact roller 23 and a scanning roller 24 being rotatably mounted in said first- and last-named forks, respectively.

The two carrier arms 19 and 20 together with bearing sleeve 18 form an integral carrier arm unit 25.

As seen in FIG. 1, carrier arm 19 has an upstanding support arm 26 projecting therefrom, with a return roller 27 rotatably mounted to the free end thereof. Looped around return roller 27 and contact roller 23 is an endless grinding belt 28a not shown in FIG. 2 for better understanding.

In the shown embodiment the grinding belt is driven via V-belts 29 and 30. V-belt 29 is looped around two sheaves 31 and 32, the first of which is fixedly keyed on a shaft 33 carrying contact roller 23, and the second of which is rotatably mounted on shaft 17. V-belt 30 is looped around a second sheave 34 integrally connected with sheave 32, and around a further sheave 36 connected to a drive source 35 mounted on top of tool carriage 11.

As long as drive source 35, for instance an electric motor, is in operation, grinding belt 28a will be driven through the V-belts.

A biasing cylinder 37 operates to pivot carrier arm 19 downwards, so that the belt grinding assembly generally designated 28 is brought into pressing engagement with workpiece 2, as shown. A further disengaging cylinder (not shown) may additionally be provided for relieving the load on belt grinding assembly 28 and for controlled raising thereof.

Tool carriage 12 has substantially the same construction as the above-described tool carriage 11. Corresponding parts are therefore designated by the same reference numerals. There is a difference, however, in that the belt grinding assembly 38 of tool carriage 12 is provided with a metal grinding belt 39a, whereas belt grinding assembly 28 is provided with a wood grinding belt 28a. Further the V-belts for driving the grinding belt are arranged somewhat differently. On the tool carriage 12, V-belt 29 extends from sheave 32 not towards contact roller 23, but rather towards return roller 27, adjacent to which a corresponding sheave is fixedly keyed to the shaft of the return roller. Although not shown in the drawings, the metal grinding belt 39a has a greater length than wood grinding belt 28a.

As seen in FIG. 2, there are provided two partial models 39 and 40 extending parallel to workpiece 2 and clamped in a similar manner between clamping mandrels 7 and 8. As seen on the righthand side of FIG. 2, clamping mandrels 8 extend through the respective bearing blocks 10 and carry a sprocket wheel 41 each on their free ends, said sprocket wheels being interconnected by a common drive chain driven by an electric motor 43.

According to the invention, each partial model 39 and 40, respectively, has associated therewith one of the scanning rollers 24 and 44, respectively, with the latter being partially hidden from view in FIG. 2 by partial model 40. While scanning roller 24 forms part of carrier arm unit 25, scanning roller 44 belongs to a further carrier arm unit 45 which is hidden from view in FIG. 2 and only schematically shown in FIG. 1. Carrier arm unit 45 has substantially the same construction as carrier arm unit 25 and is located, as seen in FIG. 1, below the plane of the workpiece and the partial models. It is to be noted that in carrier arm structure 45, belt grinding assembly 38 and scanning roller 44 are rigidly interconnected for joint movement, while in carrier arm unit 25, belt grinding assembly 28 and scanning roller 24 are interconnected for joint movement. Carrier arm unit 45 also comprises a bearing sleeve 18 pivotally mounted on a shaft interconnecting the two support plates as in carrier arm unit 25.

Workpiece 2 and partial models 39 and 40 are disposed side by side and parallel to one another in a common plane, the woodworking process being controlled by partial model 39, and the metalworking process, by partial model 40. In order to grind rifle stock 2 consisting of materials having different grinding properties, namely, wood and metal, on all sides, the two partial models are configured in such a manner as to complement one another. To this effect, partial model 39 comprises working shape surfaces 46 in correspondence to which belt grinding assembly 28 is in working engagement with the workpiece, and raised portions 47, in correspondence to which the named belt grinding assembly is not engaged with the workpiece, so that no working thereof takes place. The other partial model 40 for controlling movement of the metal grinding belt comprises raised portions 48 in areas substantially corresponding to the working shape surfaces of the other partial model 39, and working shape surfaces 49 in areas corresponding to the raised portions 47 of the other partial model 39. In the present case, raised portion 47, for instance, and working shape surface 49 are configured to have overlapping control functions, so that the metal grinding belt at the border areas of metal part 4 will sweep over a small portion of the wooden surface of the rifle stock in order to achieve a smooth transition between the wood and the metal part. It is thus clear that scanning roller 44 controls the grinding process for the metal parts, while scanning roller 24 controls the grinding process for the wooden surfaces.

The duplicating grinding machine according to the invention operates as follows: At the start, a workpiece blank is clamped between clamping mandrels 7 and 8, and in the same manner, partial models 39 and 40 are clamped between the other pairs of clamping mandrels. Care has to be taken that the partial models are correctly positioned with respect to one another and to the workpiece blank, so that there is no angular misalignment either between the two partial models and/or between a partial model and the workpiece blank. This being accomplished, the electric motor 43 may be energized in order to rotate the workpiece blank together with the partial models by way of driving chain 42. Then the belt grinding assemblies may be started up by energizing drive sources 35, whereupon the two tool carriages 11 and 12 may be started to travel. Beginning for instance at the forward end, the respective scanning rollers 24 and 44 will now follow the contours of the associated partial models 39 and 40 for correspondingly controlling the movements of the belt grinding assemblies associated therewith. As long as the scanning rollers ride along the raised portions there is a clearance between the workpiece and the correspondingly controlled belt grinding assembly. On the other hand, the respective belt grinding assembly is in working engagement as long as the corresponding scanning roller engages a working shape surface.

Due to the rotation of the clamping mandrels and the travel of tool carriages 11 and 12 in the direction of arrows A and B, both partial models will be scanned completely by the respective scanning rollers. Since the two partial models complement one another in their control functions for grinding the workpiece on all sides, the workpiece as a whole is completely finished. It is thereby possible to grind the rifle stock with a high degree of accuracy with respect to shape and weight. A dimensional accuracy of less than 2/10 mm is achievable, which in the case of wood is very accurate indeed.

FIGS. 3, 4, 5, and 6 show a process for grinding a wooden golf club head 50 on all sides. A golf club head of this kind has an integral stem portion 51 for fastening a rod thereto having a grip handle at its upper end. To this effect, the rod is inserted into a bore of stem 51 and secured therein.

The club head itself consists of a hard wood laminate having layers of approximately 1 mm thickness. Recessed in the actual impact surface 52 of the club head is a plastic insert 53. Affixed to the lower surface of the club head 50 by means of screws is a metal plate 54 of brass, as clearly shown in FIG. 6. This metal plate is likewise recessed into the bottom surface, so that the finished club head shows a smooth transition between the metal plate 54 and the two adjacent tongue-shaped areas 55 and 56 of the club head.

The duplicating grinding machine according to the invention permits to grind a preshaped club head 50 together with the plastic insert and the metal plate mounted thereon to its finished shape.

FIG. 3 shows a front view of a portion of a duplicating grinding machine corresponding to the one shown in FIGS. 1 and 2, adapted for finishing the golf club head. Individual parts of the grinding machine are only schematically shown, however.

The workpiece, i.e. the club head 50 is shown at the extreme left in FIG. 3. Above it is a belt grinding assembly 57 comprising a wood grinding belt 57a, and below it, a belt grinding assembly 58 comprising a metal grinding belt 58a. Laterally adjacent the club head is the first partial model 59, and adjacent thereto, the second partial model 60. Above partial model 59 one recognizes a scanning roller 61, and below second partial model 60, a second scanning roller 62. As in the duplicating grinding machine shown in FIGS. 1 and 2, the wood grinding belt 57a is controlled by scanning roller 61, and the metal grinding belt 58a is controlled by scanning roller 62. To this effect, belt grinding assembly 58 is connected to scanning roller 62 through a first carrier arm unit, while belt grinding assembly 57 is connected, through a second carrier arm unit, to scanning roller 61.

As clearly shown in FIG. 3, partial model 59 is provided with raised portions 63 in the cross-hatched area, with the remaining circumferential surface forming a working shape surface 64. Complementary to first partial model 59, second partial model 60 is provided with raised portions 65 at those areas corresponding to the working shape surface 64 of first model 59, while the remainder of its circumferential surface is formed as a working shape surface 66. FIG. 3 shows both scanning rollers 61 and 62 in engagement with the respective working shape surface, resulting in both grinding belts 57a and 58a being in simultaneous engagement with the workpiece.

The axes of rotation of the partial models and the workpiece, respectively, are indicated by a center cross each. It needs no further explanation that the working process for the shown club head proceeds analogously to the above described working process for a rifle stock. It shall merely be pointed out that the plastic insert 53 of the shown club head is also finished by means of the wood grinding belt, since there is no appreciable difference between the selected plastics material and the wood as regards grinding properties.

In FIG. 4, the travel of the individual belt grinding assemblies is schematically indicated by arrows. In the case of the lower belt grinding assembly 58 serving only for finishing the metal plate 54, it is possible to advance the assembly in a fast travel mode over those areas, at which it is not in working engagement, and to lower the travel speed only in the areas of working engagement.

In order to obtain a uniform finish of the bottom surface of the club head at the end of the grinding process, it is intended to arrest the club head at an accurately determined angular position as shown in FIG. 5 and to grind the entire bottom surface by means of the metal grinding belt.

The invention is not restricted to the described embodiments. It is in particular possible to modify the construction of the belt grinding assemblies. The carrier arm units must not necessarily be supported on a shaft by means of a bearing sleeve. It is thus possible to provide the carrier arm unit itself with a shaft and to rotatably support such shaft at its free ends in the support plates. Further it is possible to provide means for clamping several workpieces side by side and to connect the belt grinding assemblies required for working the same to the respective scanning rollers through further carrier arm units. In this case the individual carrier arm units may be interconnected by means of flanges.

I claim:

1. A duplicating grinding machine for grinding irregularly shaped three-dimensional workpieces consisting of at least two materials having different grinding properties comprising:

a pattern including first and second partial models, means for mounting said pattern and a workpiece in spaced parallel relation one to the other, means for rotating said pattern and the workpiece about parallel longitudinal axes, a first carrier arm unit including first and second carrier arms interconnected one with the other, a scanning roller carried by said first carrier arm for scanning the first partial model of said pattern, a first grinding assembly carried by the second carrier arm for engaging the workpiece, a second carrier arm unit including first and second carrier arms interconnected one to the other, a scanning roller carried by the first carrier arm of said second carrier arm unit for scanning the second partial model of said pattern, a second grinding assembly carried by the second carrier arm of said second carrier arm unit for engaging the workpiece, said first and second grinding assemblies having different grinding characteristics for grinding materials of different grinding properties, respectively, means for longitudinally displacing the workpiece and pattern on the one hand and said first and second carrier arm units on the other hand relative to one another whereby said scanning rollers and said grinding assemblies are adapted to traverse the entire length of the pattern and workpiece respectively, said first and second partial models having first and second raised areas, respectively, and first and second working shape areas, respectively, the working shape area of each partial model being complementary to the raised area of the other partial model, and also associated with grinding a predetermined area of like material of the workpiece, the scanning roller of said first carrier arm of said first carrier arm unit enabling said first grinding assembly to engage the workpiece when scanning said first working shape area of said first partial model to shape the workpiece in accordance therewith and to disengage from said workpiece when scanning said raised area of said first partial model, the scanning roller of said first carrier arm of said second carrier arm unit enabling said second grinding assembly to engage the workpiece when scanning said second working shape area of said second partial model to shape the workpiece in accordance therewith and to disengage from the workpiece when scanning said raised area of said second partial model, whereby said grinding assemblies selectively grind the different materials of the workpiece respectively at different locations therealong in accordance with the pattern and during a single relative longitudinal displacement of the workpiece and pattern on the one hand and the carrier units on the other hand.

2. A duplicating grinding machine according to claim 1 wherein said first and second grinding assemblies comprise belt-type grinders, respectively, each having a belt, said second carrier arm of each said carrier arm units having a contact roller, a return roller carried by each said unit, said belt extending about said contact and return rollers.

3. A duplicating grinding machine according to claim 1 wherein said models and workpieces are disposed in spaced side-by-side relation one to the other.

4. A duplicating grinding machine according to claim 3 wherein said models and the workpiece lie generally in a common plane, said first and second carrier arm units being disposed on respective opposite sides of said plane.

5. A duplicating grinding machine according to claim 1 wherein the working shape areas of said models are configured relative to one another to enable overlapping working of the grinding assemblies relative to the workpiece.

6. A duplicating grinding machine according to claim 5 wherein said second grinding assembly has characteristics for grinding harder materials in comparison with said first grinding assembly, the working shape area of said second model overlapping with the working shape area of said first model to enable said second grinding assembly to sweep over a portion of the workpiece formed of the softer material whereby smooth transition between the two materials is obtained in the workpiece.

7. A duplicating grinding machine according to claim 1 wherein said first and second grinding assemblies comprise belt-type grinders, respectively, each having a belt, said second carrier arm of each said carrier arm units having a contact roller, a return roller carried by each said unit, said belt extending about said contact and return rollers, said models and workpieces being disposed in spaced side-by-side relation one to the other.

8. A duplicating grinding machine according to claim 3 wherein said models and the workpiece lie generally in a common plane, said first and second carrier arm units being disposed on respective opposite sides of said plane, the working shape areas of said models being configured relative to one another to enable overlapping working of the grinding assemblies relative to the workpiece.

9. A duplicating grinding machine according to claim 8 wherein said second grinding assembly has characteristics for grinding harder materials in comparison with said first grinding assembly, the working shape area of said second model overlapping with the working shape area of said first model to enable said second grinding assembly to sweep over a portion of the workpiece formed of the softer material whereby smooth transition between the two materials is obtained in the workpiece.

* * * * *